Inventor
M. Bonnet

Patented Mar. 21, 1950

2,501,258

UNITED STATES PATENT OFFICE 2,501,258

OPTICAL IMAGE DEVICE HAVING LENTICULAR ELEMENTS

Maurice Bonnet, Paris, France, assignor to La Reliephographie, Société pour l'Exploitation des Procédés de Photographie en Relief Maurice Bonnet, Paris, France, a French corporation Application December 7, 1945, Serial No. 633,517
In France March 29, 1944

Section 1, Public Law 690, August 8, 1946
Patent expires March 29, 1964

1 Claim. (Cl. 88—1)

In optical selecting gratings having refringent lenticular elements, such as those utilized for instance for taking peri-stereoscopic images, it has been considered necessary up to now that the focal plane should exactly coincide with the photo-sensitive layer in which is recorded the image projected at the focus of each lenticular element of the selector. This obligation of perfect coincidence to be obtained between the focal plane of the selector and the photo-sensitive surface (or the image-plane) has often been expressed, and it appears evident (see for instance French Patents 648,977 dated June 30, 1927—page 1, lines 6 to 10, and 745,942 dated November 18, 1932—page 3, lines 86 to 89). This is why lenticular selectors have always, up to now, been given a thickness such that the rear plane face thereof, intended to come in contact with the photo-sensitive layer or with the image to be observed, exactly coincides with their focal plane.

Now, as a consequence of studies and experiments, I have found that, in practice, the best results could only be obtained by systematically departing from this rule. In accordance with the essential feature of the present invention, it is necessary that the selector should be so devised that its focal plane is located beyond the rear plane face thereof, at a distance determined by the conditions to be satisfied and which will be set forth hereinafter.

The peri-stereoscopic photography necessitates the use of two kinds of selectors; some used for view-taking, so-called "Selectographs," the others, so-called "Selectoscopes," are utilised as constituent elements of the peri-stereoscopic image.

I have found that the systematic shifting between the focal plane and the image plane must, for reasons which will also be set forth later on, differ according as to whether Selectoscopes or Selectographs are under consideration. This difference of constitution of these two screens, similar heretofore, is a feature of the new technique, in accordance with the invention. In fact, the spacing between the focal plane and the image plane, as will be seen, must be greater in the Selectoscopes than in the Selectographs.

Figure 1:
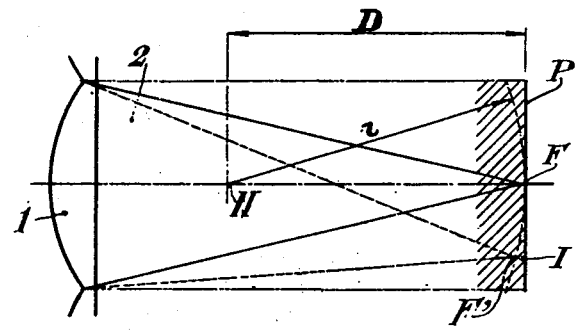
Figure 2:
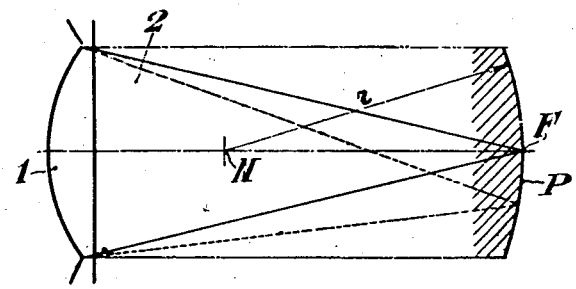
Figure 3:
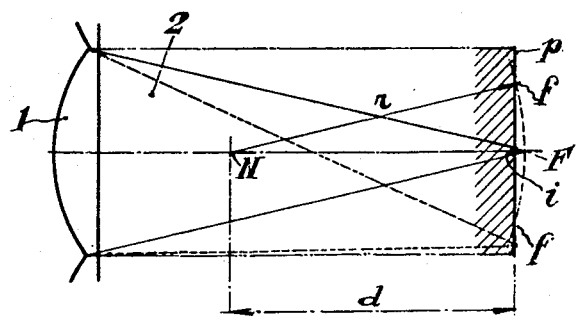

The considerations on which the invention is based are illustrated in the accompanying drawings, in which:

Figures 1 and 2 illustrate, in horizontal section and on a very enlarged scale, without the exactitude of proportions being taken into account, two constructional modifications of a view-taking selector, or Selectograph, and Figure 3 shows, in the same conditions, a Selectograph according to the invention.

In said figures:

I designates the goffered layer of the selector, producing the vertical cylindrical lenticular elements illustrated, 2 shows the rigid and plane transparent support of said selector, and N designates the nodal point of each lenticular element, through which pass the rays which are not subjected to any deviation whatever; $r$ gives out the distance separating the point N from the focus F of each lenticular element; the luminous rays converge towards said point F, which coincides with the axis of each lenticular element, when the latter is struck by the luminous rays at right angles to the plane face of the selector. Point F moves on the arc of circle having a radius $r$, in proportion as the rays strike each lenticular element more obliquely.

This phenomenon is obviously reproduced in the three embodiments of the selector which form the object of Figures 1, 2 and 3.

Figure 1 shows the embodiment corresponding to the actual manufacture of lenticular gratings; the thickness of the support 2 is chosen so that the rear plane face P thereof coincides with the image plane, located at the distance D from the nodal point N. It will be seen that this embodiment allows of obtaining a perfectly sharp image only with rays which strike the selector at right angles; the focus F of each lenticular element then exactly coincides with the rear plane face P thereof. If, on the contrary, the luminous rays strike the selector obliquely, they are refracted by the lenticular element of the latter so as to converge towards point F' for instance, always located on the arc of circle having a radius $r$. They therefore will give rise, in the plane P of the selector, to an image I, which becomes less and less sharp when the obliquity of the rays is greater. In fact, it will be seen that the image, focussed to a line F when the rays are at right angles to the rear face of the selector, spreads out along a strip I, when the rays strike it obliquely.

The second embodiment, which forms the object of Figure 2, constitutes a perfect theoretical solution; the rear face P of the selector is in this case itself goffered, in order to give rise to cylindrical surfaces having a radius $r$, that is to say, to surfaces which exactly coincide with the arc of circle constituting the geometrical locus of the points of convergence of the refracted rays in each lenticular element, whatever may be the obliquity of said rays. However, considerable material difficulties prevent the construction on an industrial scale of such gratings. In particular, the exact alignment of the lenticular surfaces, on both opposite faces of the selector, and the strict parallelism of the lenticular elements thereof, are very difficult to obtain with the actually known methods of manufacture; in any case, the cost price of such a selector would be practically prohibitive.

According to the invention, the Selectograph is therefore devised in the manner illustrated in Figure 3, in which it will be seen that the rear plane face P of the latter is located at a distance $d$ from point N smaller than the distance D of Figure 1. Under these conditions, said face P intersects the arc of circle having a radius $r$ at two points, designated by $f$. It follows that, if the rays which strike the lenticular element at right angles, and which converge towards point F, give on the rear face P of the selector only a comparatively blurred image, designated by $i$, there will be, on the contrary, two obliquities along which the incident rays will give rise to perfectly sharp images $f$ in the plane $p$.

Now, in practice, the peri-stereoscopic images are not always observed at right angles to their surface; it is even much more probable that they are observed obliquely. The embodiment according to Figure 1, which gives only one perfectly sharp image, in the total apical angle of each lenticular element, is therefore less advantageous than that forming the object of Figure 3, which, under the same conditions, gives two perfectly sharp images.

The foregoing considerations apply to Selectographs (view-taking selectors) that is to say to the selectors, which the incident luminous rays will never strike with an obliquity greater than the apical angle of the lenticular elements (16° for instance). In fact, if it were otherwise, the luminous rays which strike a lenticular element would converge on to the strip of photo-sensitive layer which corresponds to the adjacent lenticular element, which must obviously never take place. The cameras are adjusted in consequence.

A practical embodiment of the invention will now be set forth, by means of two examples.

*Selectographs.*—Width of the lenticular elements: 0.4 m./m. Radius of the lenticular elements 0.7 m./m.; $r=1.4$ m./m. The sag of the arc of circle having a radius $r$ is equal to about 0.014 m./m. Thus, and in accordance with the invention, the thickness of the Selectograph must be intentionally reduced to the extent of 0.007 m./m., relatively to the theoretical thickness.

In practice, said minimum reduction in thickness is taken into account simply by choosing within the nominal thickness the glasses intended to be used for the manufacture of the Selectographs and verified with a gauge or comparator.

Having now particularly described and ascertained the nature of my invention, and in what manner the same is to be performed, I declare that what I claim is:

An optical image device of the lenticulated type for the photography of composite images comprising a rigid transparent plate bounded on one side by a series of identical small lenticulations and bounded on the opposite side by a plane surface lying slightly nearer the lenses than the principal focal plane thereof, the thickness of said plate being such as to space said plane surface inwardly from the principal focal plane of said lenticulations by a distance equal to one-half the sagitta of the arc cut off by a chord having a length equal to the aperture of each of said lenticulations upon a circle defined by the points of convergence of the pencils of rays impinging at various obliquities upon each of said lenticulations.

MAURICE BONNET.

REFERENCES CITED

The following references are of record in the file of this patent:

UNITED STATES PATENTS

| Number | Name | Date |
|---|---|---|
| 1,935,471 | Kanolt | Nov. 14, 1933 |
| 2,144,649 | Eggert et al. | Jan. 24, 1939 |